United States Patent
Therrien et al.

(10) Patent No.: US 7,246,140 B2
(45) Date of Patent: Jul. 17, 2007

(54) METHOD AND APPARATUS FOR STORAGE SYSTEM TO PROVIDE DISTRIBUTED DATA STORAGE AND PROTECTION

(75) Inventors: David G. Therrien, Nashua, NH (US); James E. Pownell, Natick, MA (US); Adrian VanderSpek, Worcester, MA (US); Herman Robert Kenna, Harvard, MA (US); Cory Lee Sawyer, Hudson, MA (US); Elizabeth Dougherty, Northborough, MA (US); Dave Voegtlin, Norton, MA (US); Paul B. Greizerstein, Hopkington, MA (US)

(73) Assignee: Exagrid Systems, Inc., Westboro, MA (US)

( * ) Notice: Subject to any disclaimer, the term of this patent is extended or adjusted under 35 U.S.C. 154(b) by 538 days.

(21) Appl. No.: 10/658,978

(22) Filed: Sep. 10, 2003

(65) Prior Publication Data

US 2004/0093361 A1    May 13, 2004

Related U.S. Application Data

(60) Provisional application No. 60/409,684, filed on Sep. 10, 2002.

(51) Int. Cl.
*G06F 17/00* (2006.01)
(52) U.S. Cl. ........................ 707/202; 707/204
(58) Field of Classification Search .............. 365/230; 707/204, 1, 10, 200, 202; 711/161; 709/219
See application file for complete search history.

(56) References Cited

U.S. PATENT DOCUMENTS

| | | | |
|---|---|---|---|
| 5,155,845 A | 10/1992 | Beal et al. ................. 714/6 |
| 5,379,418 A | 1/1995 | Shimazaki et al. .......... 714/11 |
| 5,544,347 A | 8/1996 | Yanai et al. ................ 711/162 |
| 5,564,037 A * | 10/1996 | Lam ......................... 711/161 |
| 5,592,432 A * | 1/1997 | Vishlitzky et al. ...... 365/230.03 |
| 5,633,999 A | 5/1997 | Clowes et al. ............... 714/6 |
| 5,659,614 A | 8/1997 | Bailey, III ................. 713/165 |
| 5,764,972 A * | 6/1998 | Crouse et al. ............... 707/1 |
| 5,778,395 A * | 7/1998 | Whiting et al. ............ 707/204 |
| 5,813,017 A | 9/1998 | Morris ..................... 707/204 |
| 5,852,713 A | 12/1998 | Shannon ..................... 714/6 |
| 5,857,112 A | 1/1999 | Hashemi et al. .............. 710/8 |
| 5,893,919 A | 4/1999 | Sarkozy et al. ............ 711/114 |
| 5,960,169 A | 9/1999 | Styczinski .................. 714/6 |
| 5,966,730 A | 10/1999 | Zulch ....................... 711/162 |

(Continued)

FOREIGN PATENT DOCUMENTS

WO    WO 02/35359 A    5/2002

OTHER PUBLICATIONS

Garcia-Molina, et al., 35th IEEE Computer Society International Conference, pp. 573-577 (1990).

(Continued)

*Primary Examiner*—Apu Mofiz
*Assistant Examiner*—Chelcie Daye
(74) *Attorney, Agent, or Firm*—Mintz, Levin, Cohn, Ferris, Glovsky and Popeo, P.C.

(57) ABSTRACT

The present invention relates to a computer primary data storage system that integrates the functionality of file backup and remote replication to provide an integrated storage system.

8 Claims, 10 Drawing Sheets

Repository Nodes within Repositories

U.S. PATENT DOCUMENTS

| | | | |
|---|---|---|---|
| 5,974,574 A | 10/1999 | Lennie et al. | 714/52 |
| 6,023,709 A | 2/2000 | Anglin et al. | 707/204 |
| 6,073,209 A | 6/2000 | Bergsten | 711/114 |
| 6,088,694 A | 7/2000 | Burns et al. | 707/8 |
| 6,163,856 A | 12/2000 | Dion et al. | 714/4 |
| 6,202,070 B1 * | 3/2001 | Nguyen et al. | 707/104.1 |
| 6,269,424 B1 | 7/2001 | Katsuragi et al. | 711/114 |
| 6,272,649 B1 | 8/2001 | Hayward et al. | 714/6 |
| 6,304,882 B1 | 10/2001 | Strellis et al. | 707/202 |
| 6,330,572 B1 | 12/2001 | Sitka | 707/205 |
| 6,389,427 B1 | 5/2002 | Faulkner | 707/104.1 |
| 6,393,516 B2 | 5/2002 | Johnson | 711/111 |
| 6,446,175 B1 | 9/2002 | West et al. | 711/162 |
| 6,453,339 B1 | 9/2002 | Schultz et al. | 709/206 |
| 6,546,404 B1 | 4/2003 | Davis et al. | 707/204 |
| 6,643,795 B1 | 11/2003 | Sicola et al. | 714/6 |
| 2002/0040405 A1 * | 4/2002 | Gold | 709/231 |
| 2002/0059539 A1 | 5/2002 | Anderson | 714/6 |
| 2002/0073354 A1 | 6/2002 | Schroiff et al. | 714/4 |
| 2002/0095416 A1 | 7/2002 | Schwols | 714/6 |
| 2002/0107877 A1 | 8/2002 | Whiting et al. | 707/204 |
| 2003/0182328 A1 * | 9/2003 | Paquette et al. | 707/204 |

OTHER PUBLICATIONS

Lyon, J., 35th IEEE Computer Society International Conference, pp. 562-567 (1990).

Mohan, et al., Proceedings of the 9th International Conference on Data Engineering, pp. 511-518 (1993).

International Search Report for PCT/US03/28251; date of mailing: Feb. 10, 2004.

Supplementary European Search Report for PCT/US0328390, date of mailing: Oct. 4, 2006.

Supplementary European Search Report for PCT/US0328250, date of mailing: Oct. 5, 2006.

Supplementary Partial European Search Report for PCT/US0328251, date of mailing: Oct. 6, 2006.

Supplementary European Search Report for PCT/US0328692, date of mailing: Oct. 10, 2006.

Veritas Software Corporation, "VERITAS Volume Manager, Administrator's Reference Guide Release 3.0.1,"May 1999.

Apr. 3, 2007, Supplementary European Search Report (Communication).

* cited by examiner

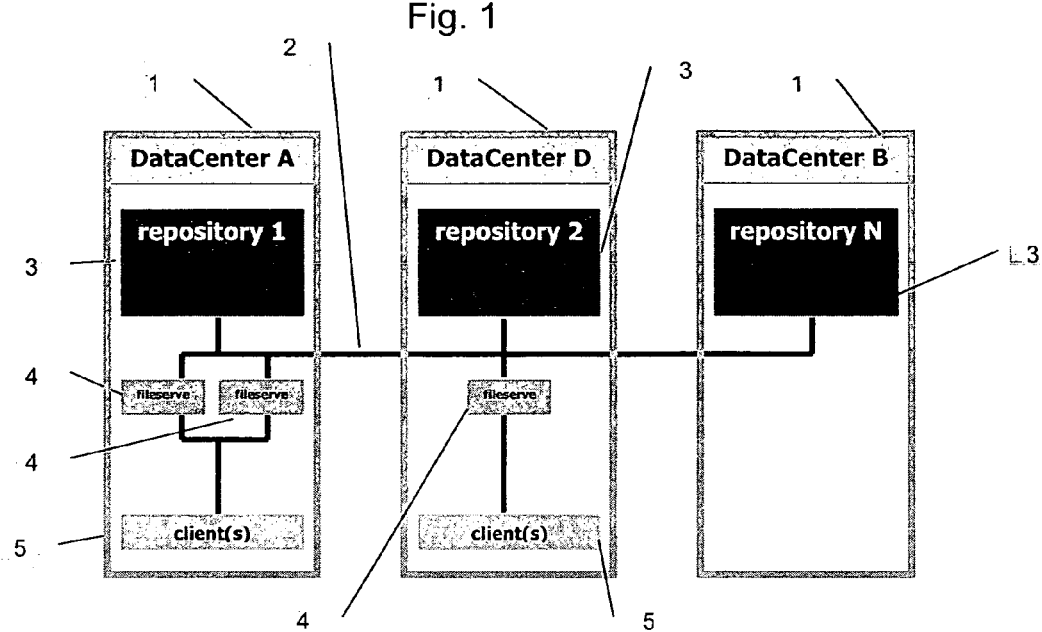
Figure 1: Sample Protected Storage Grid deployment
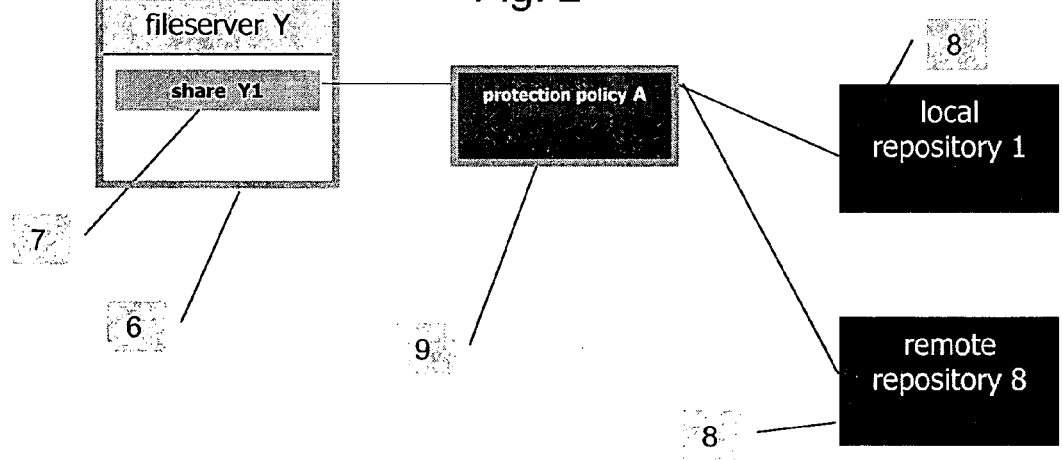
Figure 2: Protection policy

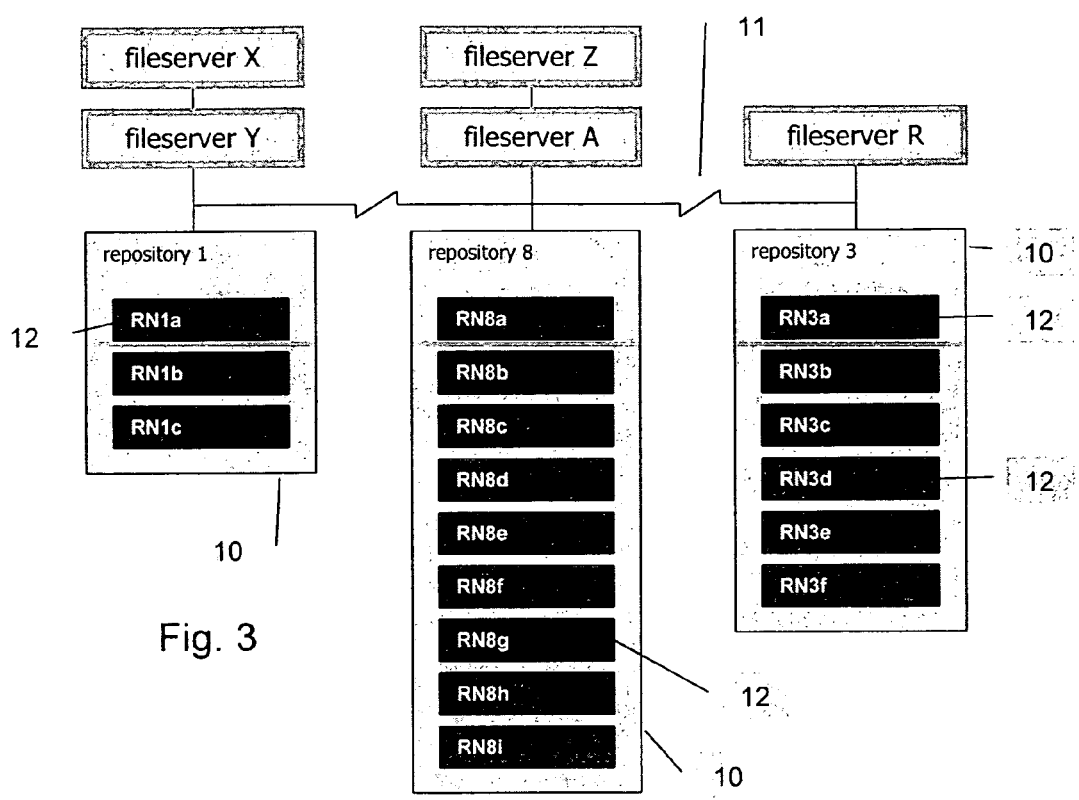
FIG 3: Repository Nodes within Repositories

Fig. 4

Policy Identification

- General
- CIFS Sharing
- NFS Sharing
- FTP Sharing
- Protection Policy

13 — Protect this share: ☑

Share: GP_Marketing/Marcom2

Protection Policy Name: marcom2

Description: 2 Local, 0 Remote

User Data: D135

Protection Management

14 — Backup Frequency: 1 Hour ▼

15 — Replicas: 2 ▼ Replicas in New York/Hudson
1 ▼ Replicas in New York/3 Charles ▼
0 ▼ Replicas in Boston ▼

Version Management

16 — Keep Version History ☑

17 — Version Compression: Delta Compression ▼

18 — Version Compaction: ☑ Keep only one daily version after 7 days
☑ Keep only one weekly version after 4 weeks
☑ Keep only one monthly version after 12 months
☑ Keep only one version after 2 years 19 — Advanced Options [Hide]

20 — ☐ Purge all versions of files that are deleted from this share 7 days after they are deleted.

21 — Caching Level: High ▼

FIG 4: Protection Policy

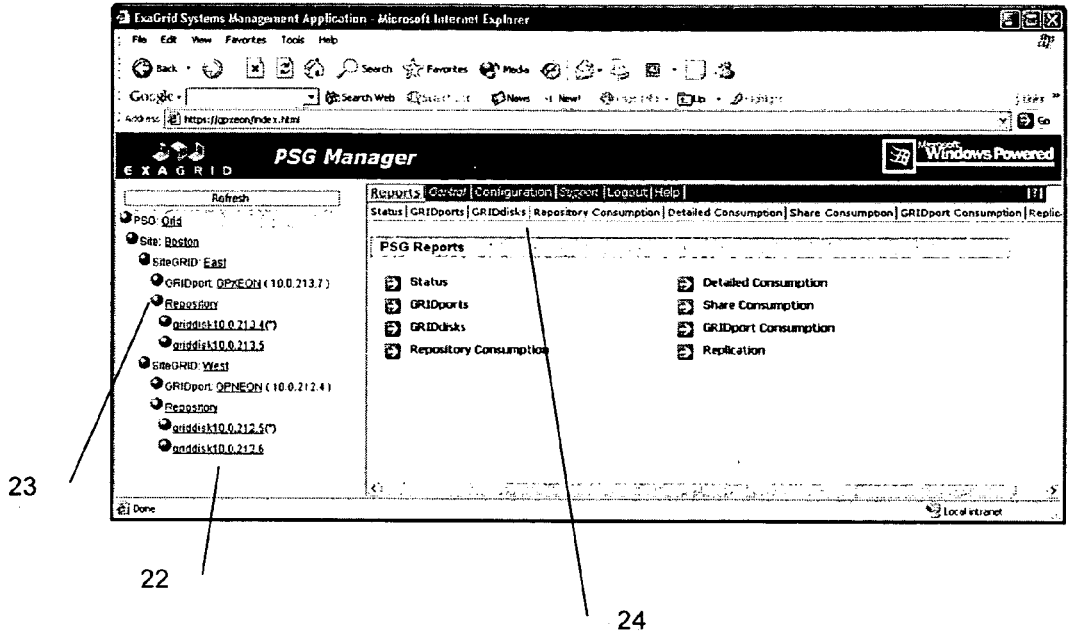
FIG 5: Web-based Management Application
FIG 6: Capacity per share chargeback reporting

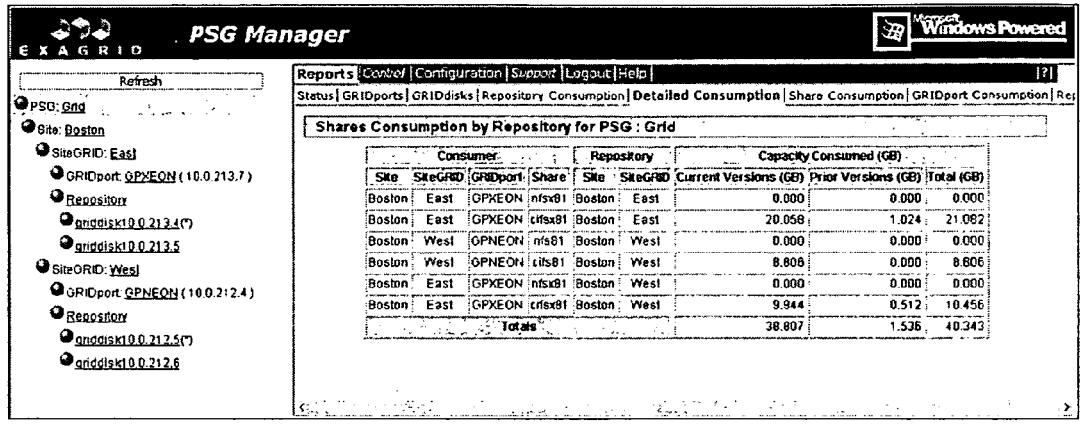
FIG 7: Capacity per share per repository reporting
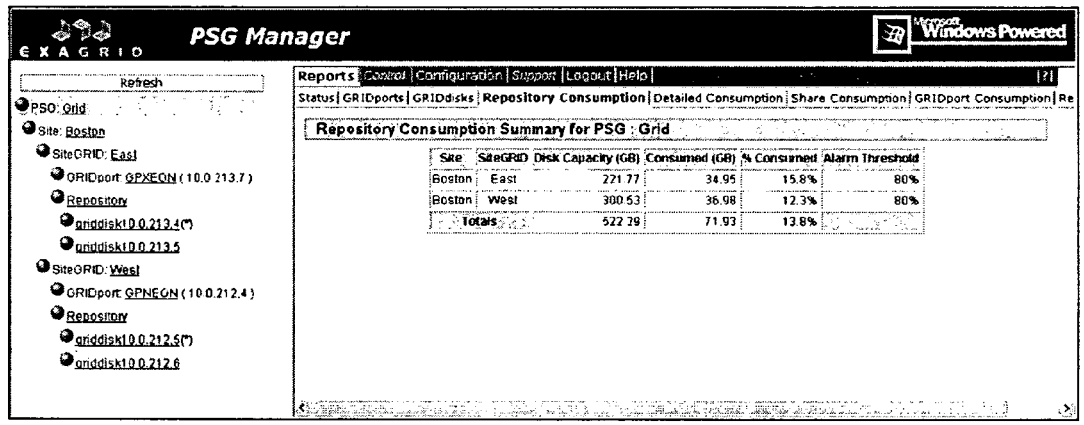
FIG 8: Capacity per repository reporting

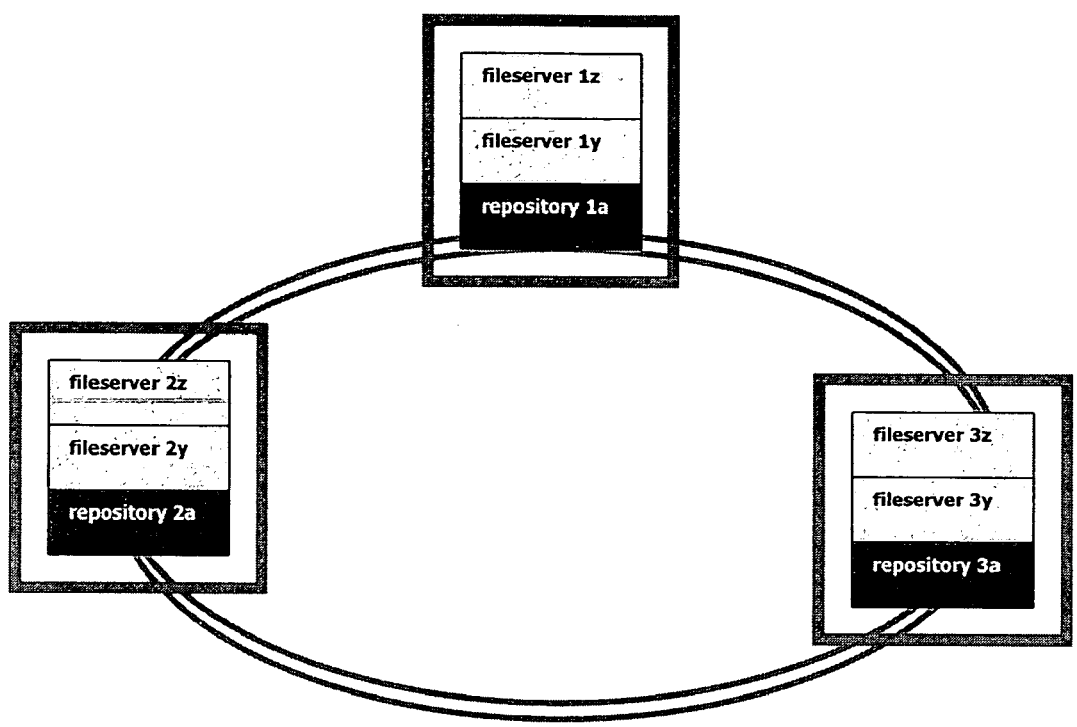
FIG 9: The present invention used as collection of distributed NAS servers, with complete local and remote data protection

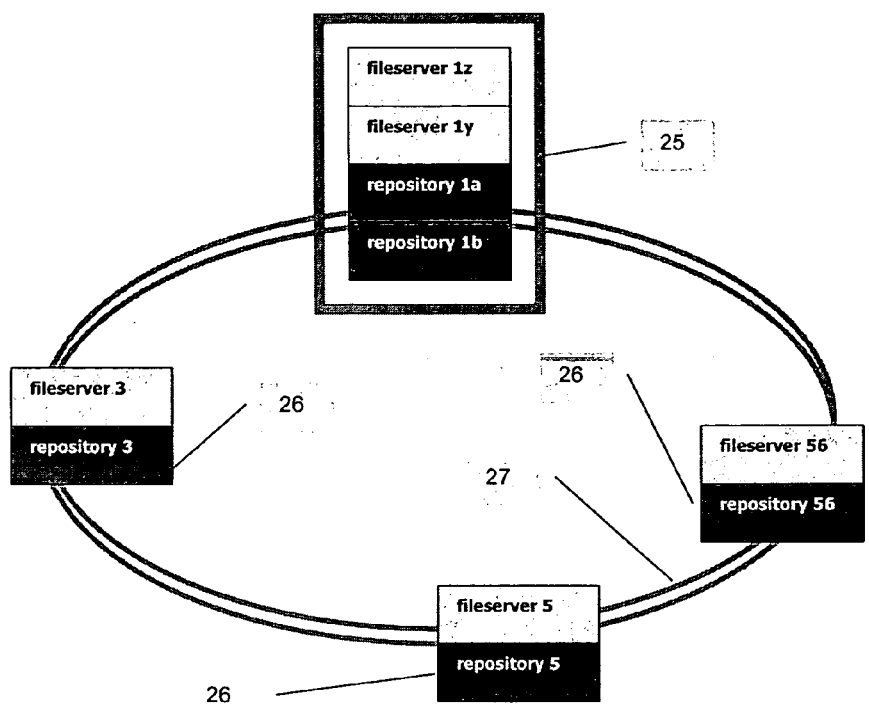
FIG 10: The present invention used in a corporation with a centralized data center and multiple remote offices

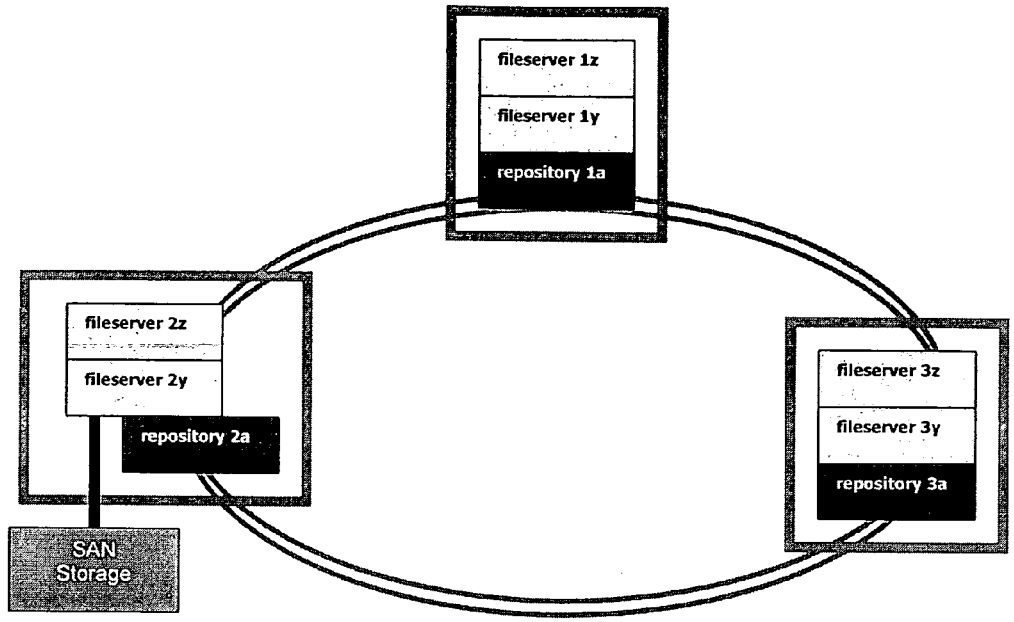
FIG 11: The present invention used to provide tiered storage services for existing SAN storage
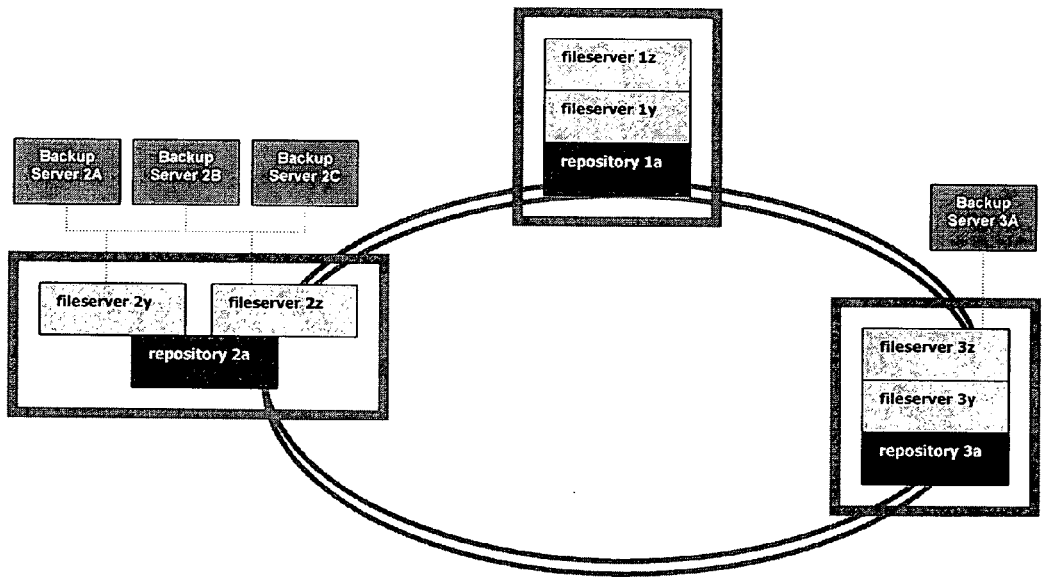
FIG 12: The present invention used as a replacement for tape drives and tape media for traditional backups

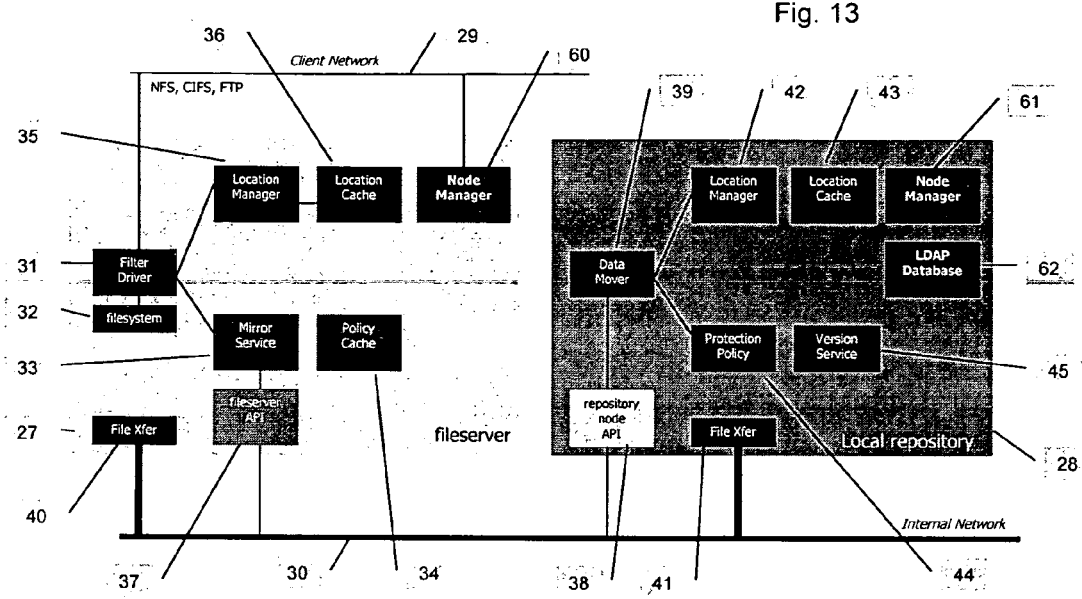
FIG 13: Apparatus and software components that are used to protect new client data to a local repository node
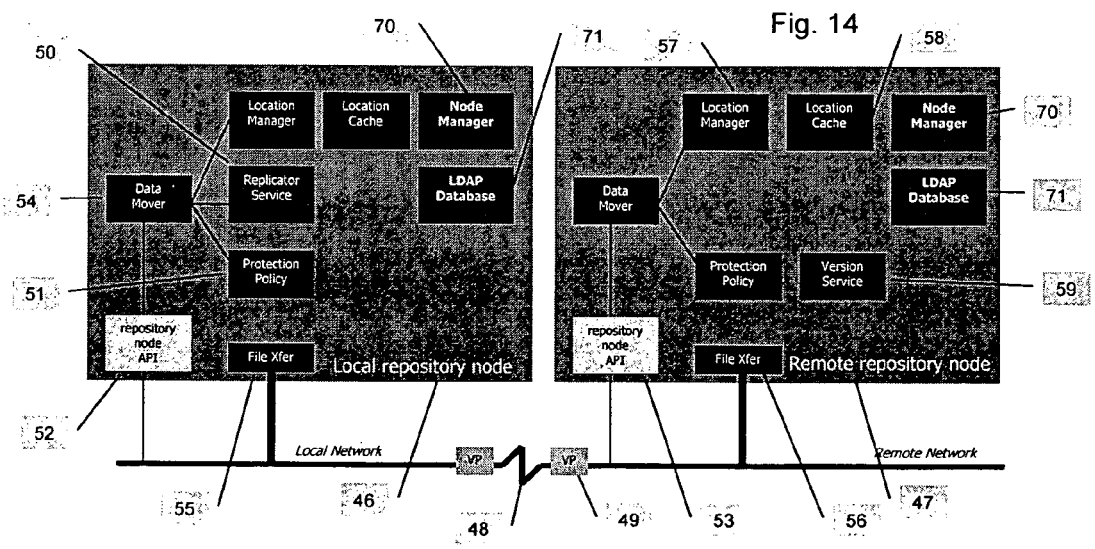
FIG 14: Apparatus that replicates data among repositories

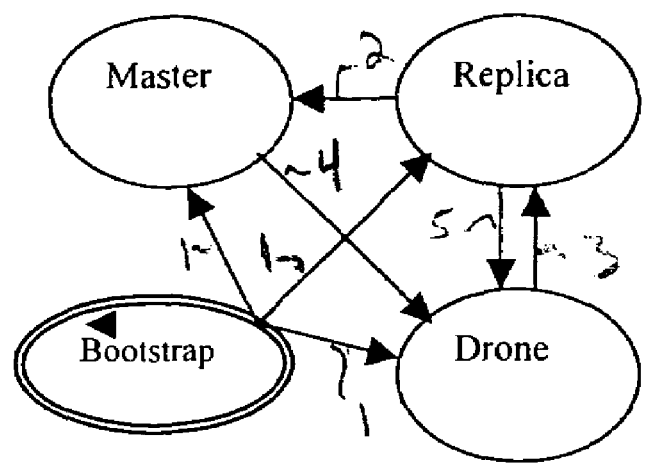
FIG 15: Node Manager Roles and state transitions

METHOD AND APPARATUS FOR STORAGE SYSTEM TO PROVIDE DISTRIBUTED DATA STORAGE AND PROTECTION

CROSS-REFERENCE TO RELATED APPLICATIONS

This application claims priority to, and the benefit of, U.S. Provisional Application Ser. No. 60/409,684 filed, Sep. 10, 2002, entitled "System and Method for Consolidated Storage and Data Protection," and incorporated herein by reference in its entirety. This application is also related to: U.S. patent application Ser. No. 10/659,129 filed Sep. 10, 2003, entitled, "METHOD AND APPARATUS FOR INTEGRATING PRIMARY DATA STORAGE WITH LOCAL AND REMOTE DATA PROTECTION" U.S. patent application Ser. No. 10/659,642 filed Sep. 10, 2003, entitled "METHOD AND APPARATUS FOR SERVER SHARE MIGRATION AND SERVER RECOVERY USING HIERARCHICAL STORAGE MANAGEMENT" and U.S. patent application Ser. No. 10/659,128 filed Sep. 10, 2003, entitled "METHOD AND APPARATUS FOR MANAGING DATA INTEGRITY OF BACKUP AND DISASTER RECOVERY DATA" each of which is incorporated herein by reference in its entirety.

BACKGROUND OF THE INVENTION

The present invention relates to a computer primary data storage system that integrates the functionality of file backup and remote replication to provide an integrated storage system.

Primary Storage

Most existing primary data storage systems are inflexible in their ability to independently scale storage capacity and I/O bandwidth/performance. For example, an existing disk array may provide 32 I/O ports of bandwidth to servers with a maximum of 10 terabytes of storage capacity where a customer may require only 4 I/O ports but require 50 terabytes of storage capacity for their applications. This monolithic approach to today's data storage systems makes it difficult to independently scale the bandwidth/performance or the storage capacity of a storage subsystem as the need (by applications) for either bandwidth/performance increases over time.

Today, data storage systems are deployed as isolated elements within each data center of a corporation. These systems are limited to operating within a single data center and are rarely inter-networked across metropolitan or wide area networks. In the rare instance where they are interconnected between two or more data centers, they employ custom interfaces and protocols and are complex to configure and administer. This lack of interconnectedness of storage resources across multiple data centers creates a problem with some resources being underutilized while other storage resources are completely consumed.

Typically, primary storage systems were not designed to be shared securely among multiple local client applications across multiple departments of a corporation. Storage area network (SAN)-based disk systems can be deployed to attempt to protect each server from seeing the contents of a logical unit number (LUN) (an amount of storage capacity provided by one or more disk drives, with possibly some degree of RAID protection) of another server. There are many conflicting and cooperating schemes for masking LUNs from unwanted servers using disk subsystem security, SAN switches security and/or host/server security. These schemes are difficult and complex to manage when used in combinations. For this reason, servers from one department that connect to a SAN often require that their data not be commingled on the same SAN with the other departments' data. This requirement significantly drives up SAN cost and complexity.

In addition, without storage capacity resource sharing, the average consumption of all resources is typically below 50%. Because the long-term demand for data storage by each application is unpredictable, half of the storage resources approach 90% utilization while the other half are operating mostly unused at 10–20% capacity. If all of these storage resources could be shared by more applications in a secure manner, the overall utilization could be increased to about 80–90%. An article entitled "Real-World Storage Utilization" in the April 2003 volume of STORAGE magazine indicates that average SAN storage utilization is 39%.

Today, file systems are created upon volumes, and a volume can be an aggregation of storage space from multiple physical disk drives. When a file system has no more available capacity for users or applications, a storage or system administrator can allocate more disk drives to the server. Then the administrator can aggregate these disk drives into a larger volume and finally the administrator can expand the file system to accommodate more user data. When a file system fills up, administrators must respond immediately to the condition before all storage space is consumed and applications stop functioning. A typical data center may have hundreds of filesystems, and each of these can fill up at any hour of the day, and must be immediately remedied. In a thesis entitled, *Reducing the Cost of System Administration of a Disk Storage System Built from Commodity Components*, Satoshi Asami (UC Berkeley—Report No. UCB/CSD-00-1100) compiled the following research data related to service actions that must be performed outside of normal business hours:

- A system administrator who has just been called in by a pager in the middle of the night is more likely to make mistakes that one that conducts repairs only during regular work hours. This lack of sleep was one factor that contributes to egregious disk copying mistakes.
- There has been significant research in the field of physiology and psychology on the subject of sleep deprivation and human performance. Individuals are less likely to perform tasks correctly and efficiently after a long period of work and also during normal sleeping hours.
- Sleep-deprived subjects tend to exhibit reactive behavior rather than perform a preventive, model-based strategy in dealing with problems. Operators make more frequent interventions in order to stabilize a system when faults occur, sometimes without a clear idea of what is wrong. It is worth pointing out that this kind of careless reflective behavior is dangerous on a storage system in a vulnerable state, and can easily lead to data loss.

Furthermore, for traditional network attached storage (NAS) systems, when a file system fills up, some amount of data must be migrated from one NAS server to another. This migration disrupts users that are denied access to data during the movement and it often takes many hours to complete the migration.

Expensive SAN-based storage systems are being front-ended with NAS gateway appliances to provide NAS client systems with network file system (NFS) and common Internet file system (CIFS) access to SAN disk storage. While this scheme provides a convenient way to extend NAS storage capacity as application demand increases, it places a growing amount of underutilized, infrequently accessed data on SAN storage which represent the most expensive form of primary data storage. There are add-on hierarchical storage management products that might work to migrate the least recently used data out of the SAN and into lower cost storage, but this data management software cannot be installed and run on the most popular existing NAS servers.

Data Protection, Backup, Hierarchical Storage Management (HSM), and Archiving

Data protection systems such as backup servers, tape library units, tape drives, backup server and client software and media are also not shareable across multiple sites or among multiple backup servers within the same data center. This creates an imbalanced over-utilization and under-utilization of tape drive resources.

Furthermore, when storage administrators store data on magnetic tape, they typically also create a second duplicate tape that is sent to an offsite storage facility. This tape duplication process is costly to administer and doubles the media cost related to backup data protection.

On a related note, primary storage has limits on how much historical data it can maintain. It is common for data centers to archive data onto magnetic tape periodically and to remove the data from the servers to free up capacity for new applications. Because this data has been removed from servers, it is no longer accessible by applications. If an application requires access to a file that has been archived, it typically must be restored through a manual request to the archive administrator. Because it is difficult to assess which data should be archived and which data should remain on servers, it is common to have data that is often accessed and important to maintain on primary storage accidentally archived while data that should be archived remains on primary storage consuming valuable storage capacity that could be used by more critical data.

In addition, there are many conflicting & independent data protection schemes used for protecting primary storage. These protection schemes include redundant arrays of independent disks (RAID), snapshots (a copy of a set of data at a particular instant in time), tape backup, offsite tape storage, and remote synchronous or asynchronous disk replication at either the block or file level. These all work independently to provide some level of data protection. This independence creates a problem of over-replication where every megabyte of primary data storage can be protected by as many as 15 megabytes of data on this multiplicity of independent data protection tools.

There are many companies that are geographically organized with one or two major data centers and tens to hundreds of smaller remote offices. There are typically no trained storage administrators at the smaller remote offices, so proper storage administration is difficult to manage. This variability in data management practices across sites puts these companies in jeopardy of losing significant amounts of current data when one or more of the remote offices are lost after a site disaster. One solution to this problem would be to have all remote office data centrally backed up to the central data centers. Unfortunately, backup software programs do not operate well with the additional latency of long wide area communications links, so this is currently not a feasible solution.

Turning to the needs of applications, applications such as medical radiology imaging, pharmaceutical clinical trials research, oil exploration and digital libraries can require that data be maintained and accessible for many decades. Data protection systems that employ magnetic tape typically become obsolete and backward incompatible with their tape drives every 7–10 years. A large number, by one account over one hundred, magnetic tape cartridge/media formulations have been created since magnetic tape's inception. A corporation that maintains their valuable long-term historical data on now obsolete media typically must make a decision to either maintain older generation drives that can continue to read these media, or to perform the arduous administrative task of copying data from these older media technology to newer media technology. Moreover, the older the data is, the more difficult it becomes to successfully retrieve it, not only because of the availability of compatible drive technology, but also because the readability of data on a tape degrades over extended periods of time. Another problem with long-term access to data is just locating tapes that were checked out of tape vaults or repositories but never returned or are misplaced within the repository.

Many applications like seismic core sample analysis and medical imaging/radiology would greatly benefit from a long-term archiving storage system that would allow them to access decades-old data as quickly, reliably and efficiently as data that was just created.

On a related note, system administrators often use hierarchical storage management (HSM) systems to migrate least-recently used data to less expensive data storage media. System administrators typically back up HSM storage systems to tapes to protect the most active data that has not been migrated onto less expensive media. These isolated data management applications, e.g., the HSM system that protects migrated data and the backup system that protects non-migrated data, are typically purchased from different vendors and most often do not interoperate with each other. This can lead to over-replication of data because neither application knows of the other application's data protection policies.

With the cost of magnetic disk quickly approaching the cost of magnetic tape, a number of new products called "disk-to-disk backup" products have emerged. Most of these solutions do not attempt to eliminate the significant management and administration problems associated with magnetic tape storage. In fact, they can complicate an already complicated tape backup process by injecting a low-cost disk storage system between a backup server and its tape library. These low-cost disk subsystems can be potentially effective in reducing the time it takes to backup client data, but these solutions also increase storage management complexity and capital cost.

Returning to tape backups, tape backups are typically performed on a schedule where all primary storage data is written to a set of magnetic tapes on a weekly basis as part of a full backup. Data that changes between these full backups is committed to tape nightly as part of an incremental or differential backup. Full backups present the greatest challenge to most backup administrators in being able to complete a backup within the weekend backup window from Friday night through early Monday morning. As the amount of data to be protected continually increases, the time it takes to perform a full backup increases until the point in time where the weekend window for completing backups is regularly exceeded.

On a related note, software-based file replication systems today can provide local and remote copies of data. While replication can provide some form of disaster recovery, only the latest copy of each file is maintained by software-based replication products. These systems must also be protected by a tape backup solution to provide complete data protection with historical versions of each file being maintained over time. Replication products also suffer from the problem of how to handle file deletion. More specifically, replication products need to determine when a local copy of a file is deleted, whether the remote copy be deleted. There are applications where all copies of a file should be deleted if the local copy is deleted and other applications or accidental actions where the remote copy should not be deleted. While most products offer the ability to control what happens to a remote copy of a file when a local file is deleted, it is difficult to apply a general policy for handling file deletion, since it may vary on a file-by-file basis. Finally, systems that employ replication effectively double the primary storage, which again increases the number of replicas that are retained for every file that is created.

Storage Management Applications

Every primary storage device and data management software application today has a user interface in the form of a graphical user interface and/or a command line interface. A storage administrator must regularly be trained on these interfaces to successfully monitor, control, and configure each storage component. For every primary storage system having a collection of data protection systems, an administrator may have to become proficient in many, e.g., as many as a dozen, different interfaces.

Additionally, even when a corporation standardizes on a limited set of data storage and data protection vendors, each of these components does not present a multi-data center view of all of these storage resources and applications. Each data center manages their local storage resources with a limited view of the storage and protection resources within their data center. While web-based management interfaces allow a user to view data from any location, the data that's represented within the user interface is typically limited to a single site.

On a related note, cost accounting for storage resource consumption is a complex problem. Storage resource management applications can provide a global view of primary storage consumption by user, filesystem, department, cost-center, region, etc., but fail to provide an accounting of the storage resources consumed by data protection applications like backup, replication, RAID and snapshots. Without proper cost accounting for both primary storage as well as data protection resources, some departments are overcharged for total storage resource consumption while other departments are undercharged.

SUMMARY OF THE INVENTION

The present invention relates to a computer primary data storage system that integrates the functionality of file backup and remote replication to provide an integrated storage system. One embodiment of the invention provides a data protection system for protecting files on a fileserver. The system includes a primary repository in communication with the fileserver via a network.

The primary repository has: a primary repository node for storing data; a primary repository node API in communication with the primary repository node and with the network for communicating with the fileserver; a primary repository file transfer module in communication with the primary repository node and with the network for receiving files from the fileserver; a data mover in communication with the primary repository node API (for supervising the replication of files from the fileserver to the primary repository node); a location component in communication with the data mover for storing file location data; a directory service for maintaining storage state for the primary repository node; and a node manager in communication with the location component and with the directory service (for managing primary repository node storage capacity and performance).

The system can further include a fileserver and/or a remote repository. In one embodiment, the remote repository is in communication with the primary repository via a network. The remote repository can include: a remote repository node operative to store data; a remote repository node API adapted for communicating with the remote repository node and with the network; a remote repository file transfer module in communication with the primary repository file transfer module and with the remote repository node and adapted for receiving files from the primary repository file transfer module; a data mover in communication with the remote repository API and operative to supervise the replication of files from the primary repository node to the remote repository node; a location component in communication with the data mover and operative to store file location data; a directory service operative to maintain storage state for the remote repository node; and a node manager in communication with the location component and with the directory service and operative to manage primary repository node storage capacity and performance.

Another embodiment of the invention provides a method for managing node managers in a repository having a plurality of nodes with associated node managers. The method includes: starting the node managers in a bootstrap state; selecting a master node manager and a replica node manager according to specified criteria; setting all remaining node managers to drone state; and if at least one of the master and replica node managers fails, then selecting a replacement node manager from the drone node managers according to the specified criteria.

BRIEF DESCRIPTION OF THE DRAWINGS

FIG. 1 is a diagram of a deployment of one embodiment of the present invention across three data centers.

FIG. 2 illustrates how one embodiment of a protection policy creates a relationship between a fileserver share and associated repositories.

FIG. 3 is a diagram of 3 repositories such as those shown in FIG. 1 with associated repository nodes.

FIG. 4 shows a screenshot of one embodiment of a user interface for the protection policy of FIG. 2.

FIG. 5 shows one embodiment of a user interface for a web-based application that manages a data protection system such as the system illustrated in FIG. 1.

FIG. 6 shows one embodiment of a share consumption report associated with the user interface of FIG. 5; this report is useful to CIOs as a means of regularly charging back the utilization of storage resources to individual departments based on their consumption of shares of capacity.

FIG. 7 shows one embodiment of a capacity per share per repository report associated with the user interface of FIG. 5; this report is most often used by storage administrators to identify the shares of storage capacity that are most responsible for consuming a particular repository's storage capacity.

FIG. 8 shows one embodiment of a capacity consumed per repository report associated with the user interface of FIG. 5; this report is used by storage administrators to determine how consumed each repository is in order to alert them to the need to purchase additional repository.

FIG. 9 shows one embodiment of a configuration of multiple fileservers sharing multiple repositories to provide NAS functionality to clients while protecting their data locally and remotely.

FIG. 10 shows one embodiment of a configuration of the present invention for a corporation that has a centralized IT infrastructure with many smaller remote offices.

FIG. 11 shows one embodiment of a configuration of the present invention for delivering tiered storage services using a customer's existing SAN.

FIG. 12 shows one embodiment of a configuration of the present invention as a tape drive/tape media replacement with traditional backup servers and software.

FIG. 13 shows one embodiment of a system for protecting new client data to a local repository node.

FIG. 14 shows one embodiment of a system that replicates data among repositories.

FIG. 15 shows one embodiment of state transitions that a repository node may go through as a Node Manager within a repository as illustrated in FIGS. 3, 13, and 14.

DETAILED DESCRIPTION OF THE DRAWINGS

FIG. 1 is a diagram that illustrates the invention of an integrated primary data storage and data protection system. Fileservers 4 provide primary data storage capacity to client systems 5 via standard network attached storage (NAS) protocols like network file system (NFS), common Internet file system (CIFS) and file transfer protocol (FTP). The apparatus is designed to operate among two or more data centers 1 shown in FIG. 1 as data centers A, B, and D. Two or more repositories 3 deployed across these data centers provide storage capacity and data management processing capability to deliver complete data protection for their associated fileserver primary storage systems. The apparatus leverages metropolitan or wide area Internet protocol (IP) networking (MAN or WAN) 2 to allow repositories to send and receive data that must be replicated from one repository to another. By having data replicated to a local and at least one remote repository from the originating fileserver, these repositories act as a replacement for traditional on-site tape backups as well as off-site tape storage/vaulting services. In the event of a site disaster, all fileservers that were destroyed are quickly recovered by deploying new fileservers at a surviving site and recreating the content of the failed fileservers from the content in the surviving repositories.

FIG. 2 illustrates the association between a fileserver 6 and the two or more repositories 8 that may be deployed across data centers. All primary data storage activity occurs between one or more clients and one or more fileservers through a NFS, CIFS or a FTP share 7. A share is created on a fileserver as a directory or folder of storage capacity. The contents of this shared directory or folder is accessible by multiple clients across a local area network. For example, in the Microsoft Windows environment, CIFS shares appear as storage folders within LAN-connected servers under "My Network Places" of the Windows Explorer user interface. For UNIX environments, shares are accessed through mount points which define the actual fileserver and folder where data will be stored as well as a virtual folder of the local client system's file system.

A fileserver will be configured to have at least one share and possibly tens of shares. These shares allow the primary storage capacity of the fileserver to be shared and securely partitioned among multiple client systems. Because this apparatus is both a primary data storage and data protection system, the storage administrator defines how each share of a fileserver will be protected across two or more repositories through the creation of a unique protection policy 9 for that share. In one embodiment, this protection policy defines not only which repositories will be used to protect each share's data. In one embodiment, it also defines how often data protection will occur, how many replicas will be maintained within each repository based on the criticality of a share's data, and how updates and modifications to share data should be maintained. On a periodic basis, each fileserver examines the protection policy for its shares and when appropriate, the fileserver captures all recent changes to a share's files and stores protects these files within two or more repositories.

FIG. 3 is a diagram that shows three repositories 10, i.e., repository 1, 3, and 8, that are remotely connected to each other via metropolitan or wide area networking 11. Each repository has two or more repository nodes 12, e.g., repository nodes RN3a and RN3b. Each repository node has the processing power to perform integrity checking on all of its files, to delta or file compress its files, to maintain version chains for each file and to compact files. Each repository node interacts with other repository nodes in order to replicate or re-replicate files that failed their integrity check or are now unavailable because a repository node's disk drive, a repository node or an entire repository has failed. As shown in FIG. 3, repository nodes can be added to each repository independently as the demand for storage capacity grows for that repository. Additionally, fileservers can be added to increase the overall bandwidth and performance that client applications experience when accessing the overall apparatus.

FIG. 4 is a screenshot of one embodiment of the present invention's protection policy. In one embodiment, there is a unique protection policy defined by a storage administrator for each share of each fileserver. Before arriving at the protection policy screen, a storage administrator creates a share and allows it to be accessible by CIFS and/or NFS and/or FTP. Once a new share is created, the protection policy screen is displayed. Within this screen, the storage administrator can specify the following data protection parameters:

Protect this share 13—this checkbox is normally checked indicating the data in this share should be protected by repositories. There are certain client applications that might choose to use a fileserver for primary storage, yet continue to protect data using third party backup or archiving products. If this checkbox is left unchecked, all other options in the protection policy user interface are disabled.

Protection Management—Backup Frequency 14—this option determines how often a fileserver share's data will be protected in the local and remote repositories. In one embodiment, the backup frequency intervals can be selected from a list of time intervals which include: 15 minutes, 30 minutes, 1 hour, 2 hours, 3 hours, 4 hours, 6 hours, 8 hours, 12 hours and 24 hours. All backup frequency intervals are anchored to 12:00 midnight of each fileserver's local time zone. Setting the backup frequency to 24 hours is similar to performing traditional daily incremental backups. Setting this interval to 15 minutes allows versions of files that change often during the day to be protected on 15-minute intervals. Only files that have changed since the last backup occurred are saved in repositories.

Protection Management—Number of replicas per repository. This option is where a storage administrator determines how many replicas 15 of data to create within each repository 16 when a share is protected. In one embodiment, there must be at least one replica stored in a repository that is local to the share's fileserver. It's possible to maintain multiple replicas within a single repository. In this case, replicas are maintained on different repository nodes of a repository to ensure continued access to a replica in the event of a single repository node failure or network failure. The location and number of replicas can be changed over time. To increase data availability for data that is increasing in criticality, more replicas per repository and additional repositories may be specified. For data that is decreasing in importance, fewer replicas may be maintained in the repositories, which makes more storage capacity available to other shares that are also using those repositories.

Version Management—Keep Version History 17—this checkbox should be checked for shares whose file content is regularly being updated. When checked, the specified repositories will maintain a version chain of all changes that were identified at each backup frequency interval. For shares of data that have unchanging file content, this checkbox can be unchecked.

Version Management—Version Compression 18—In one embodiment, the three compression options are to not compress, to delta compress or to file compress a share's files. File compression refers to a variety of techniques known to those of skill in art for compressing a file so that it does not take up as much storage space as an uncompressed file. Delta compression typically provides the highest compression ratio for shares whose files are regularly being modified.

Version Management—Version Compaction 19—compaction provides a means of removing versions of files based on the version's age. For example, the version compaction option for a file share may be configured to maintain only one monthly version of a file after a year, one weekly version of a file that's older than 6 months and one daily version of a file that's older than 1 month. All "extra" versions can be automatically purged from repositories, which makes more storage capacity available for new versions of files.

Advanced Options—Purge on Delete 20—In one embodiment, by default, this option is not selected. In this mode, when an application or user intentionally or accidentally deletes a file from a fileserver, the repository-resident replicas and versions associated with that file are unaffected. This allows the storage administrator to recover the files that were accidentally deleted from a fileserver in much the same way as data is restored from backup tapes today. The Purge on Delete option, when checked, is effective with applications like third party backup, file archiving, document and content management and email archiving, where some of the replicas and versions that are being retained by repositories are no longer needed to satisfy a that application's recovery window and may be purged from all repositories when the file is deleted from a fileserver.

Advanced Options—Caching Level 21—this option allows the storage administrator to set the amount of client data that will be cached on a fileserver. In one embodiment, normally this option is set to "Optimize for Read" to allow the maximum number of most-recently accessed files to be available to client applications at the highest performance levels. All least recently used data is maintained in two or more repositories. Conversely, the caching level can be set to "Optimize for Write", which reduces the amount of cached data available to clients but provides consistently high levels of available storage capacity to write-mostly applications like third party backup. In this mode, by aggressively moving data off of a fileserver into repositories, the application sees the fileserver as a storage device with virtually infinite capacity.

FIG. 5 shows one embodiment of a user interface for a web-based application that manages a data protection system such as the system illustrated in FIG. 1. The lower left pane of the user interface provides an asset tree 22 showing a top level hierarchy defined in this case by city locations with one or more data centers. Each data center has one or more fileservers and repositories. Each repository has two or more repository nodes. Thus, in one configuration, an integrated data storage and protection system according to the invention is deployed across two or more data centers, e.g., data centers located in West Boston, East Boston, and New York. In the user interfaces illustrated in FIGS. 5–8, the fileservers, i.e., the primary data storage devices, are referred to as GRIDports and the repository nodes are referred to as GRIDdisks.

In one embodiment, the status of each real asset (repository nodes and fileservers) is represented by colored objects 23 that symbolize the operational status of that element. If the component is operating normally, a green sphere is shown. If the component is operating in a reduced capacity, a yellow warning triangle is displayed. Finally, if the component is not operational, a red circle with an "X" in it is displayed. The status of repository nodes and fileservers is rolled up to higher levels of the hierarchy. For instance, if a repository node was down, the repository node, its repository, its data center, its city and the top level tree indicator would all reflect that "down" condition. This facilitates locating problem components quickly, which becomes very important as the number of components grows, potentially into the hundreds over time.

The tabbed menu bar 24 allows administrators to select one of several available reports, e.g., status, GRIDports, GRIDdisks, repository consumption, detailed consumption, share consumption, GRIDport consumption, and replication.

The tabbed menu bar also allows administrators to select a Configuration tab. The application manager via the configuration user interface allows an administrator to control devices remotely (e.g., restart a repository node, or bring a fileserver online). Administrators perform file restoration and configure the protection policy for each fileserver share through this configuration tab as well.

FIG. 6 shows one embodiment of a share consumption report associated with the user interface of FIG. 5. This report is useful to CIOs and CFOs as a means of regularly accounting for the utilization of storage resources to individual departments based on their consumption of shares of capacity. The first four columns, i.e., site, siteGRID, GRIDport, and share, define the location of the fileservers and their shares. Current version capacity is associated with how much repository storage capacity is being consumed by that share for the most current version of the files in the share. Prior version capacity is associated with all capacity that is being consumed by repositories for all versions of all files except the latest version of the files in the share. Finally, a total of current plus prior version capacity is displayed in the rightmost column. This report provides up to date information on which shares are consuming the most or least storage capacity among the many repositories that might be deployed.

FIG. 7 displays a more detailed capacity report that shows each fileserver's share and the amount of current and prior versions of storage capacity they are consuming per repository. This report is most often used by storage administrators to identify the shares of storage capacity that are most responsible for consuming a particular repository's storage capacity. Each share is protected by two or more repositories.

FIG. 8 shows the capacity consumed per repository. Storage administrators monitor repository capacity consumption levels to determine when more repository nodes should be added to the repository. More specifically, the repository consumption summary report has columns for site, siteGRID, disk capacity, capacity consumed, and percent of capacity consumed. A siteGRID represents a collection of fileservers (GRIDports) and repositories. This view of capacity reporting also provides an alarm threshold column. The alarm threshold is a threshold that the storage administrator can set on a per repository basis to allow the administrator to be alerted when the consumption of a repository crosses that specified consumption percentage.

FIG. 9 shows one embodiment of a configuration of multiple fileservers, e.g., fileservers 1y, 1z, 2y, 2z, 3y, and 3z sharing multiple repositories, e.g., 1a, 2a, and 3a, to provide NAS functionality to clients while protecting their data locally and remotely. More specifically, repositories 1a, 2a, and 3a are geographically associated with fileservers 1y and 1z, 2y and 2z, and 3y and 3z, respectively. Repositories and fileservers are connected together via standard IP networks, which can be deployed redundantly for increased availability. Fileservers provide NAS based primary storage to clients that are local to the fileserver. A share that is located in fileserver 1z may have its data protected locally in repository 1a and remotely in repository 3a, for example. Through the present invention's protection policy, each share of each fileserver can be configured to have its data protected in two or more repositories. It is also possible to allow one repository to maintain multiple replicas of a share's data for additional redundancy. In this case, two or more repository nodes within the same repository would each maintain a replica to provide continued availability to at least one replica in the event a repository node becomes unavailable due to network, or system resource failures.

FIG. 10 shows one embodiment of a configuration of the present invention for a corporation that has a centralized IT infrastructure 25 with many smaller remote offices 26. The remote offices are interconnected via the corporation's existing IP metropolitan or wide-area networking 27. In this configuration, fileservers provide primary storage to clients at each remote location. Shares associated with these fileservers can be configured to have their fileserver data protected in both their local repository and in a repository located at corporate headquarters 25. To increase availability a second major data center might be defined to allow data to be replicated to two centralized data centers.

FIG. 11 shows one embodiment of a configuration of the present invention adapted to deliver tiered storage capability using a customer's existing SAN. FIG. 11 shows the same configuration as is shown in FIG. 9 except that fileserver 2y is coupled to SAN storage instead of employing internal fileserver disk storage for the purpose of caching most recently accessed file data. For companies that have decided to base their primary storage infrastructure on SAN-based storage, the fileservers can be connected to SAN storage. In FIG. 11, all fileservers have their own internal disk storage except fileserver 2y. In one embodiment, this fileserver, i.e., fileserver 2y, connects to SAN storage via a FibreChannel networking connection. Through this interface, the fileserver 2y has one or more SAN LUNs allocated to itself to allow these SAN LUNs of storage capacity to act as local storage for that fileserver. Since the fileserver implements hierarchical storage management, fileserver files that reside on the SAN LUNs that are least frequently accessed are automatically migrated from these expensive SAN volumes to the much lower-cost local and remote repositories using conventional hierarchical storage management techniques. Additionally, all of the data that resides in the SAN volumes that are allocated to a fileserver are protected in local and remote repositories, thereby eliminating the need for employing third-party tape backups or offsite replication products for protection.

FIG. 12 shows one embodiment of a configuration of the present invention as a tape drive/tape media replacement when used with traditional backup servers and software. This configuration is different than the integrated backups that can be provided by another embodiment of the invention for new files that are created or modified on the fileserver as part of providing NAS services to client applications. In this model, a customer would already be using a popular third party backup application and they are directing backup data that was collected from one or more client systems and would traditionally be written to a series of magnetic tapes to a collection of fileserver shares instead. FIG. 12 shows the same configuration as is shown in FIG. 9 except that fileservers 2y and 2z are networked to backup servers 2A, 2B, and 2C and fileserver 3z is coupled to backup server 3a. Backup servers 2A, 2B and 2C, may each be configured to use one or more shares across fileserver 2y and/or 2z. In this model, fileserver shares can be used instead of tape drives to store backup data. This form of backup, commonly referred to as disk-to-disk backup, greatly simplifies the administration of backups without having to manually manage tape media. Additionally, magnetic disk drive cost is also approaching cost parity with magnetic tape subsystems (tape drives, tape jukeboxes, tape media), so disk-to-disk backup becomes a cost effective alternative to traditional tape storage. Traditional tape drives are directly connected to a backup server and cannot be shared with other backup servers. This creates utilization problems where many tape drives remain idle on some backup servers while other backup servers are limited in bandwidth because they are not connected to enough tape drives. With this apparatus, since multiple shares can be created on each fileserver, and these fileservers are available to all backup servers, each of these backup servers can choose to use one or more shares across one or more fileservers in order to accelerate backups by dividing the data to be backed up across multiple fileserver shares and allowing backups to operate in parallel.

Additionally, since each fileserver share can be configured to operate with hierarchical storage management, as new backup data is written from a backup server to a share, older backup files are automatically replaced with their stub file equivalent to minimize storage consumption on the fileserver. To the backup application, a fileserver share appears to the backup application as a tape drive with a magnetic tape that never runs out of capacity.

As noted above with respect to FIG. 4, a special protection policy option allows the caching level of a fileserver's shares to be set to a low level, thereby maximizing the amount of capacity on that fileserver for incoming backup data. Local and remote repositories act as replacements for traditional replicated magnetic tapes and offsite storage.

Other benefits of using embodiments of the invention to perform backups and restores include:

Faster restoration of data—restores occur within seconds since data to be restored is available on high-speed networked disks, not on a collection of magnetic tapes. Tapes must be physically located, loaded into tape drives, and then searched to the proper point in the tape where data is located. This can take from tens of minutes to hours per tape.

No lost or misplaced tapes

Fewer full backups are required since each incremental backup is accessible at disk speeds. The current standard tape backup model is set up to perform full backups every weekend and incremental backups on a daily basis. This standard schedule for backups was designed to minimize the number of tapes that would be required in order to perform a full + incremental restore of data. In the present invention, since the time to locate media, load it into a drive and search to data is reduced from tens of minutes or hours to typically less than a second, e.g., milliseconds, fewer full backups need to be performed since accessing tens to hundreds in incremental backups can take place at disk and network speeds, not the slow load and search times of traditional tape drives. This model of performing fewer full backups can also dramatically reduce storage consumption since each full backup can consume tens to hundreds of tapes in typical corporate storage environments.

Obsolete backup files can be deleted more efficiently from disk-based repositories than when that same data is stored on sequential tapes. With tape it is not possible to reclaim space on a single medium. The capacity of a magnetic tape can only be reused when ALL of the data on that tape has been marked as obsolete.

Eliminating the management associated with making duplicate tapes so that one copy can be sent to an offsite storage facility while the other copy remains in the local data center.

Eliminating the monthly tape storage costs at third party storage facilities. Repositories are deployed within a corporation's data centers to allow each of these data centers to act as the offsite storage repository for other data centers.

Repositories are continually checking their file content for correctness. If a repository finds a file is corrupted, it replaces the corrupted file with a verified replica from another repository. Traditionally, monitoring the quality of tapes is a time consuming process and is rarely performed.

Reducing the tape media and tape drive obsolescence problem. Tape media that is written today may not be readable by drives in 5 to 10 years, making tape an unsuitable choice for long term archiving. The present invention leverages networking technology that has proven to be backward compatible over time. 10 Mb/sec Ethernet network interface cards (NICs) interoperate with 100 Mb/sec and 1 Gb/sec Ethernet NICs and switches. This is the technology point that eliminates obsolescence. Internal to repository nodes and fileservers there may be many changes to disk drive interfaces, but these changes will not affect the external standard Ethernet network connection.

Backups that are sent to tape drives will fail when there are no available backup tapes to write to. With the present invention, one or more shared fileservers can be used as shared tape drives to reliably allow backups to be directed to fileserver shares that have additional capacity.

Disk-based restores can be many times faster than magnetic tape-based restores, particularly when data would have to be retrieved from multiple tapes.

Greatly reduced service and acquisition management—no tape drive and library repairs, no scheduled tape drive cleaning, no need to continually purchase new tapes, and no need to specify, purchase and deploy uniquely numbered barcodes or tape cleaner cartridges.

FIG. 13 and FIG. 14 illustrate modules used to protect data files created by a client using a local repository and a remote repository. FIG. 13 displays one embodiment of the apparatus and software modules of the present invention that are associated with protecting client files to a local repository. The apparatus includes a fileserver and a single local repository node 28. Clients access a fileserver via the client IP-based (Internet Protocol) network 29 and communicate with the fileserver using NFS, CIFS or FTP protocols. All fileservers and all repository nodes are interconnected by an internal IP-based (Internet Protocol) network 30. Current client files reside on a fileserver's file system 32.

In one embodiment, the filter driver 31 intercepts all input/output activity initiated by client file requests. The fileserver software maintains a list of all modified or created files since this last snapshot occurred. Snapshot intervals can range from 15 minutes to 24 hours, based on the backup frequency 14 of the protection policy. On the schedule of the backup frequency, the mirror service 33 prepares all modified files in a share to be put into the repositories 16 (shown in FIG. 4) that are specified in that share's protection policy.

The protection policies are stored and replicated across multiple repositories, and they are cached and regularly updated within each fileserver in the protection policy cache 34. For example, if a share's protection policy has its backup frequency set to one hour, on the transition to the next hour, the mirror service 33 initiates a backup of all changed files since the last backup to a local repository 28.

For all new files, any repository node of the local repository can be used to hold a replica of a file. For files that have been modified, the mirror service directs new versions of the existing file to the same repository node as prior versions of that file.

The mirror service queries the location cache 36 to determine which repository node should receive an updated version of an existing file. This location cache is updated regularly by the location manager 35 when the fileserver writes files to specific repository nodes. Once the location manager identifies all destination repository nodes for each file of a share for the latest collection of updated or created files, the fileserver communicates to each local repository via a fileserver API 37 and a repository node API 38.

Each repository node's data mover 39 supervises the replication of files from the fileserver to its repository node. The fileserver file transfer module 40 transfers files from the fileserver file system to each repository node's file transfer 41 module. Once the files are replicated to specific disk drives within a repository node, its location manager 42 updates its location cache 43 with repository node location information.

For all files that arrive at a repository node that are modified versions of existing files, the share's protection policy 44 version management settings are reviewed to determine whether new versions should be compressed and whether older versions should be maintained. The version service 45 is responsible for managing all policy-based compression and decompression, and purging versions based on the "keep only one version" option of a share's protection policy.

At this point in the description, client data is only replicated to a local repository. FIG. 10 illustrates one embodiment of modules that implement a process that protects data to one or more remote repositories to completely protect client data from site disaster. FIG. 14 displays a local repository node 46 that, from the actions described in FIG. 13, holds the first replica of data. FIG. 10 also shows a remote repository node 47. These are connected to each other across a metropolitan or wide-area network 48. In one embodiment, all data that is transferred between local and remote repositories may be secured by virtual private networking (VPN) 49 encryption. The local repository node's replication service 50 is responsible for reviewing the protection policy 51 for all files that were just created as part of the recent fileserver backup. Each repository node acts as a peer of other repository nodes. Based on the protection policy each repository node manages the movement of files among all repository nodes using repository node APIs 52, 53, data movers 54, and file transfer modules 55, 56. Once the data is replicated to remote repositories, the location manager 57 of each repository node updates the location cache 58 to track where files are maintained within that repository node. The version service 59 of the remote repository node manages file version compression, and compaction according to the protection policy.

The user interface that has been described for monitoring and controlling the distributed storage and protection apparatus is implemented with two basic software components as shown in FIG. 13 and FIG. 14. Each fileserver and each repository node includes a Node Manager 70. Also within each repository, there is one designated current master repository node that maintains an operational instance of an LDAP directory 71.

In one embodiment, the Node Manager 70 is responsible for the following:

Collecting asset, status, capacity and performance data from subcomponents, e.g., the location cache, of the fileserver or repository in which it is executing.

Submitting that collected data to a local LDAP repository 71 to allow data to be persistently stored within a repository node Presentation of LDAP information to storage administrators through the repository node application program interface (API) and a web-based user interface.

Command-line interface to allow customers to develop program scripts to acquire information about the distributed storage apparatus and to control and configure this apparatus.

SNMP and email notification to storage administrators for significant events like a component or network failure, or a low-capacity indication.

Each Node Manager within a repository node negotiates for the role they will play within the repository. Each repository is designed to be fault tolerant. A repository node can act as the master node manager, the replica node manager or a drone node manager to support this fault tolerance. The master node manager manages that repository's LDAP directory. The master node manager is responsible for knowing when any of the other repository nodes has become unavailable. The master Node Manager regularly collects statistics from other repository nodes in its repository. A replica node manager runs in a different repository node and monitors the master node manager.

FIG. 15 shows a state diagram for repository node's node manager. All repository nodes start up in the Bootstrap state. In one embodiment, during initialization 1, a master is chosen by an election process that selects the repository node in the local subnet with the alphanumerically lowest IP address. The Replica is the next lowest IP, and all other systems are Drones.

Additionally, in FIG. 15, the transitions from Replica to Master and Drone to Replica occur to recover from failure conditions. If a Master is detected to have failed, the Replica transitions 2 to Master. If a Replica is detected to have failed, the Drone with the next lowest IP address transitions 3 to Replica.

Finally, in FIG. 15, the transitions from Master and Replica to Drone occur to prevent duplicate Masters and Replicas in a repository. If a Master is isolated from the rest of the repository nodes due to a network failure, a new Master and Replica will be elected by the failover transitions described above. If the old Master (or replica) returns to the network, it will transition 4 (5) to a drone state since a new master (or replica) has been elected.

To provide fault tolerance for data maintained in the distributed LDAP database, the following are two mechanisms for data replication: intra-repository replication and inter-repository propagation.

Intra-repository replication ensures there is a backup of the database in the local repository on the Replica repository node. This allows the Replica to recover immediately from a Master recovery node failure. In one embodiment, anytime a record changes, the database files are transferred to the Replica, e.g., via the FTP. If a replica cannot be found to replicate data to, a message is published telling the local grid to elect a new replica. On the next write attempt, the updated files will be replicated. If the FTP fails, an error is recorded.

Inter-repository propagation ensures inventory, configuration and status data changes are propagated to remote Masters so that Grid components from anywhere in the Grid can use their local database as a source for inventory, configuration and status information. Data from each repository is propagated to each remote repository. If any propagation attempt fails, an error is logged. Every 24 hours, each repository resends its current information to all remote repositories so any missed propagations are repaired.

In the event of a disaster involving the loss of a repository, the repository's directory can be restored from a read-only copy residing in a remote repository.

Thus, the present invention relates to providing a secure, shareable, scalable disk-based, distributed data storage and data protection system as an alternative to the traditional isolated primary disk storage and magnetic tape systems it is designed to replace.

One embodiment of the present invention provides an integrated data storage and data protection system that is physically deployed across two or more data centers. A deployment of the apparatus within each data center includes one or more fileservers and one or more repositories. The fileservers provide primary disk storage capacity to IP-networked clients via NFS, CIFS or FTP protocols. Each repository is a virtualized pool of disk storage capacity that:

Acts as a replacement for magnetic tape backup systems by regularly storing and maintaining versions of changed or new files.

Acts as a replacement for offsite media storage and offsite disaster recovery systems by replicating all data that is stored in a repository that's local to a fileserver to one or more offsite repositories.

Acts as a logically secure storage system that permits the commingling of data within a repository for improved repository capacity utilization.

Acts as a physically secure storage system with specific repositories configured to have no data commingled with other data sets One embodiment of the present invention provides a two-level storage system apparatus that provides primary data storage to clients and applications at the first level and storage for data protection at the second level.

The primary storage level is made up of a collection of fileservers. These provide NFS and CIFS accessible file services to clients and applications. These fileservers have many features that make them different than traditional NAS servers:

They employ HSM to eliminate the administrative problems associated with responding to file systems that regularly run out of available capacity. In addition, HSM ensures that most recently accessed data is quickly accessible and that all data created, even data that is decades old, is as accessible as data that was created yesterday.

They can act as tape drive replacements. HSM policies can be set for shares of these fileservers to guarantee that space will always be available to write more data to. These fileservers will also maintain the most recent backups in order to accelerate restore operations.

Fileservers can act like tape drives to backup servers. They are more flexible in that they exist on a standard IP network to allow multiple backup servers to access the same fileserver or multiple fileservers.

As each fileserver is added, it is attached to a distributed set of data protection repositories. The fileserver includes a protection policy to allow it to define how all of its data will be protected by these repositories.

These fileservers can be attached to SANs to allow most-recently accessed data to reside on high-speed SAN disks and least recently used data to be transparently migrated to lower-cost repository storage. All data continues to be quickly accessible, regardless of age or access patterns.

The storage for data protection level is made up of a collection of virtual repositories. These repositories are made up of two or more repository nodes. These nodes are essentially computer systems with a CPU, memory, IP networking and about a terabyte of disk data storage. Special software runs in each of these repository nodes to allow it to perform internal data management functions as well as cooperate with other repository nodes to maintain data over the long-term. Repositories are designed to be deployed across multiple data centers. The capacity of each repository can be leveraged by each of the fileservers at the first level.

A typical deployment of the entire data storage and data protection system may have two or more data centers, each with multiple fileservers and one or more repositories. Each local fileserver has the ability to be protected by at least one local and one remote repository.

For each NAS share on a fileserver, a unique protection policy is defined. This protection policy defines how that share's data is going to be protected among two or more repositories.

Repositories that are distributed across multiple locations provide the following data protection features to this two-level storage system:

Least recently used fileserver data is moved from fileservers into local and remote repositories as part of the HSM functionality. If a fileserver's primary storage system is connected to a SAN, the HSM functionality provides tiered storage, automatically migrating least recently used data from high cost SAN storage volumes to lower cost repository storage.

Complete backup and site disaster recovery through the implementation of versioning and replication techniques.

Secure sharing of data protection resources. Repository capacity can be securely shared among multiple fileservers. A fileserver that placed data into a repository can only access the files that it placed there. In addition, multiple repositories may be deployed per site to allow applications that must not have their data commingled with other data on the same physical storage resources.

More effective capacity utilization of data protection resources. Instead of having islands of data protection resources like tape drives and media located at each site, each repository's capacity utilization is optimized because it's being shared by all fileservers that have been granted access to that repository.

The present invention includes extensive reporting and control with its web-based management application. It provides:

A global view of all assets and their current operational status.

Secure local administration of fileserver storage resources

Chargeback-level storage capacity reporting which includes primary storage consumption, as well as all capacity consumed to protect that primary storage both locally and remotely. This type of reporting is not provided by today's fragmented and isolated data storage and data protection tools and systems Traditional data storage systems rely on centralized management to manage all other components of the storage system. The present invention does not rely on a single, static master management node. It elects one master management node per repository and re-elects a different master management node if the current master management node fails.

What is claimed is:

1. A data protection system for protecting files and modified versions of the files on a fileserver, the system comprising:

a primary repository in communication with the fileserver via a network, the primary repository having:

a primary repository node operative to store the files and modified versions of the files;

a primary repository node API in communication with the primary repository node and with the network and operative to communicate with the fileserver;

a primary repository file transfer module in communication with the network and with the primary repository node and adapted for receiving the files and modified versions of the files from the fileserver;

a data mover in communication with the primary repository node API and operative to supervise the replication of the files and modified versions of the files from the fileserver to the primary repository node;

a location component in communication with the data mover and operative to store file location data for each file and each modified version of each file;

a directory service operative to maintain storage state for the primary repository node; and a node manager in communication with the location component and with the directory service and operative to manage primary repository node storage capacity and performance.

2. The data protection system of claim 1 wherein the system further comprises:
a fileserver having:
a filter driver operative to intercept input/output activity initiated by client file requests and to maintain a list of modified and created files since a prior backup;
a file system in communication with the filter driver and operative to store client files;
a policy cache operative to store a protection policy associated with a set of files;
a mirror service in communication with the filter driver and with the policy cache, the mirror service operative to prepare modified and created files in a share to be written to the primary repository node as specified in the protection policy associated with the set of files;
a location cache in communication with the mirror service and operative to indicate which repository should receive an updated version of an existing file; and
a location manager coupled to the location cache and operative to update the location cache when the system writes a new file to a specific repository node.

3. The system of claim 2 wherein the mirror service directs new versions of an existing file to the repository to which prior versions of the file were written.

4. The system of claim 2 wherein the system further comprises:
a fileserver API coupled to the mirror service and operative to communicate with a repository; and
a fileserver file transfer module in communication with the file system and operative to transfer the files and modified versions of the files from the file system to at least one repository.

5. The system of claim 4 wherein the primary repository further comprises:
a protection policy component in communication with the data mover and operative to determine whether new versions of existing files should be compressed and whether older modified versions of existing files should be maintained.

6. The system of claim 5 wherein the system further comprises:
a remote repository in communication with the primary repository via a network, the remote repository having:
a remote repository node operative to store data;
a remote repository node API adapted for communicating with the remote repository node and with the network;
a remote repository file transfer module in communication with the primary repository file transfer module and with the remote repository node and adapted for receiving the files and modified versions of the files from the primary repository file transfer module;
a data mover in communication with the remote repository API and operative to supervise the replication of the files and modified versions of the files from the primary repository node to the remote repository node; and
a location component in communication with the data mover and operative to store file location data for each file and each modified version of each file;
a directory service operative to maintain storage state for the remote repository node; and
a node manager in communication with the location component and with the directory service and operative to manage primary repository node storage capacity and performance.

7. The system of claim 2 wherein the protection cache is operative to define which repositories are used, how often data protection occurs, how many replicas are maintained within each repository, and how modifications to share data are maintained.

8. A data protection system for maintaining historical backup copies of files on a fileserver, the system comprising:
a primary repository in communication with the fileserver via a network, the primary repository having:
a primary repository node operative to store historical backup copies of a file on the fileserver;
a primary repository node API in communication with the primary repository node and with the network and operative to communicate with the fileserver;
a backup file transfer module in communication with the network and with the primary repository node and adapted for receiving historical back up copies of files from the fileserver;
a data mover in communication with the primary repository node API and operative to supervise movement of historical backup copies of files from the fileserver to the primary repository node;
a location management module in communication with the data mover and operative to maintain location of historical backup copies of files;
a directory service operative to maintain location and duplication of historical backup copies of files; and
a node manager in communication with the location management module and with the directory service and operative to manage primary repository node storage capacity and performance;
wherein said historical backup copies of files include modified versions of the files.

* * * * *